United States Patent [19]

Mitarai et al.

[11] 4,115,738
[45] Sep. 19, 1978

[54] DIGITAL FREQUENCY SHIFT SIGNAL DEMODULATOR

[75] Inventors: Akira Mitarai, Yamatokoriyama; Sigekazu Fujiwara, Nara, both of Japan

[73] Assignee: Sharp Kabushiki Kaisha, Osaka, Japan

[21] Appl. No.: 816,279

[22] Filed: Jul. 15, 1977

[30] Foreign Application Priority Data

Jul. 16, 1976 [JP] Japan ................................ 51-85432

[51] Int. Cl.² ........................ H03D 3/04; H03K 9/06; H04L 27/14
[52] U.S. Cl. .................................. 329/105; 325/320; 329/107; 329/126
[58] Field of Search ............... 329/104, 105, 107, 110, 329/126, 127, 128; 325/320, 321, 325

[56] References Cited
U.S. PATENT DOCUMENTS

3,571,712  3/1971  Hellworth et al. .................. 325/320
3,636,454  1/1972  Pasternack et al. ................. 325/320
4,021,744  5/1977  Montefusco ........................ 329/105

Primary Examiner—Siegfried H. Grimm
Attorney, Agent, or Firm—Birch, Stewart, Kolasch and Birch

[57] ABSTRACT

An FS signal demodulator includes a zero-crossing detector which detects zero-crossings of frequency shift signals (FS), a pulse converter which generates a train of "0" and "1", "0" representative of a time slot from the first detected zero-crossing through a given period of time and "1" representative of a time slot from that period through the next succeeding zero-crossing, a memory means receiving the outputs of the pulse converter and thus containing the train of the pulses with the length corresponding to modulation rate, a counter means counting the number of "1's" or "0's" contained within the memory means in response to clock signals, and a determination circuit which effects frequency discrimination by comparing the counts of the counter means with a given limit.

3 Claims, 16 Drawing Figures

FIG.7 BAND-PASS FILTER

OP Amp : NJM 4558D by NJR

FIG.8(a) ZERO-CROSSING DETECTOR flip flop : T.I. SN 7474
exclusive OR gate : T.I. SN 7486

FIG.8(b)

FIG. 9 (a) PULSE CONVERTER

FIG. 10(c) SHIFT REGISTER

SN 7491 : 8 bit shift register
SN 74195 : 4 bit shift register

FIG. 10(d) SHIFT REGISTER

FIG. 11 COUNTER

FIG. 12 DECISION CIRCUIT

DIGITAL FREQUENCY SHIFT SIGNAL DEMODULATOR

BACKGROUND OF THE INVENTION

The present invention relates to a demodulator for an FS communication system used mostly for data transmission.

As well known in the art of data communication, the FS communication system is a kind of frequency modulation communication wherein digital signals "1" and "0" are represented by two different frequency carrier waves and these carrier waves are alternately transmitted. The transmitted signals in the FS communication are called "frequency shift signals (FS)". Demodulators at an FS signal receiving station are usually implemented with LC tuning circuits, zero-crossing detection techniques, etc. That is, these demodulators depend upon analogue technology.

Many approaches have been attempted to rearrange a variety of circuits in digitalized fashions because of the recent development of inexpensive, reliable and small-sized LSI's.

Accordingly, it is an object of the present invention to provide a demodulator digital LSI capable of digitally demodulating FS signals.

BRIEF DESCRIPTION OF THE DRAWINGS

Other objects and novel features of the present invention are set forth in the appended claims and the present invention as to its organization its mode of operation will best be understood from a consideration of the following detailed description of the preferred embodiments taken in connection with the accompanying drawings, wherein:

DETAILED DESCRIPTION OF THE INVENTION

Figures 1, 2, 3:
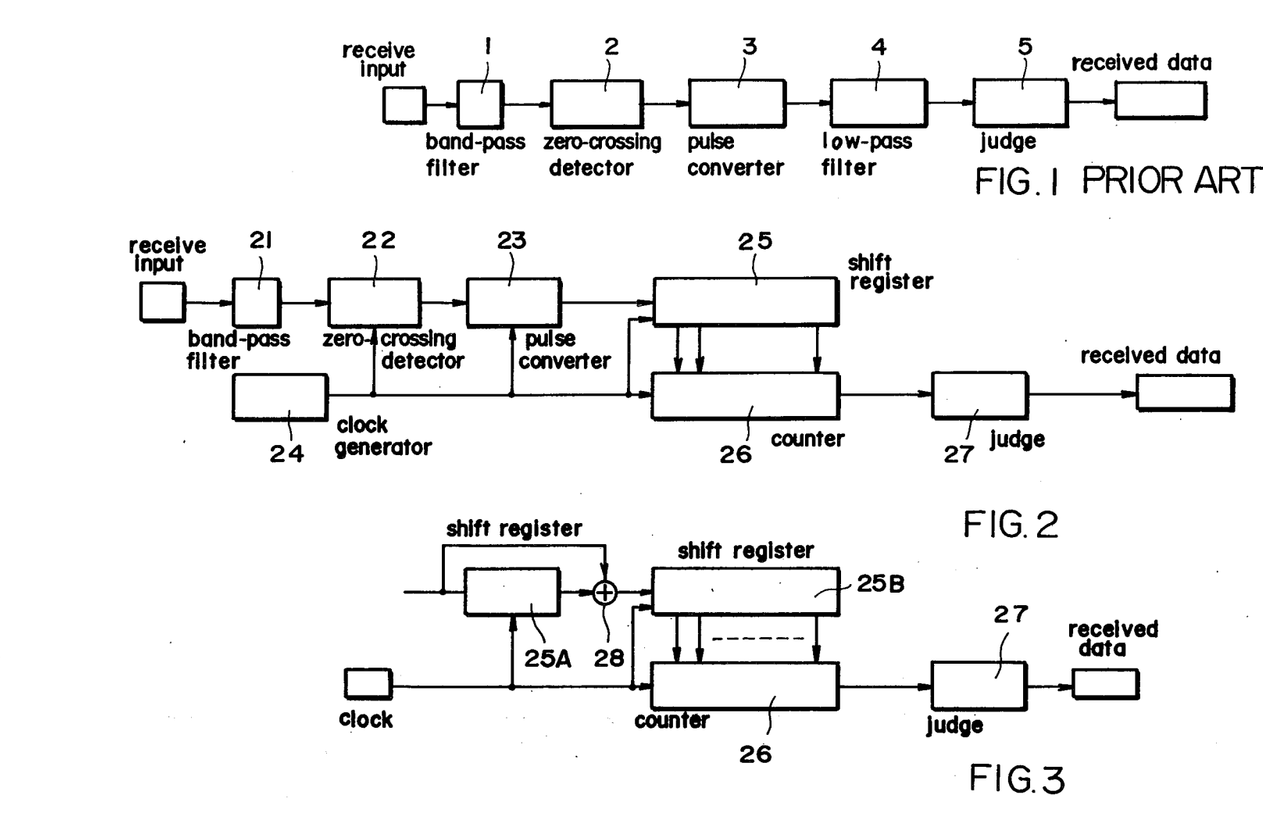
FIG. 1 is a block diagram showing a prior art FS signal demodulator.
FIG. 2 is a block diagram showing one preferred form of a digital FS signal demodulator in accordance with the present invention.
FIGS. 3 and 4 are block diagrams showing other preferred forms of the present invention.

First of all, a prior art FS signal demodulator employing the zero-crossing detection technique is illustrated and discussed in FIG. 1 to facilitate an understanding of the present invention.

In FIG. 1, an amplifier not shown amplifies FS signals being received up to an appropriate voltage level and then a band-pass filter picks up FS signal components therefrom. An amplitude limiter not shown makes the amplitude of the FS signal components fixed. Thereafter, FS signals shaped as transmitted FS signals are obtainable, which in turn are introduced into a zero-crossing detector 2 so that pulses are generated when crossing the time axis. The pulses are applied to a pulse converter 3.

An integration circuit or a low-pass filter 4 corresponding to a modulation rate smooths a D.C. component of the output of the pulse converter 3, which in turn is supplied to a judge circuit 5 for the purposes of effecting frequency discrimination. As stated above, it was very difficult to implement such a prior art demodulator onto an inexpensive, reliable and small-sized LSI semiconductor chip because it effected the frequency discrimination in an analogue fashion.

FIG. 2 illustrates a block diagram of a demodulator embodying the present invention. After received FS signals have been properly amplified via an amplifier not shown, FS signal components are extracted through a band-pass filter 21 with the amplitude thereof being rendered fixed. The resulting FS signals are similar to ones being transmitted. These FS signals are introduced into a zero-crossing detector 22 so as to change into pulses occurring when the FS signals cross the time axis, and then supplied into a pulse converter 23. Clock signals from a clock generator 24 also are applied to the zero-crossing detector 22 and the pulse converter 23.

The output of the pulse converter 23 is introduced into a shift register 25 in response to the clock signals from the clock generator 24. The shift register 25 has the capacity of data of the length corresponding to one modulation rate. The shift register 25 is connected with a counter 26 which counts the number of "1's" contained within the shift register at every clock signal.

The counter 26 is connected to a judge circuit 27 which determines whether the output of the counter 26 exceeds a given value for the purposes of effecting frequency discrimination between two different frequencies. Therefore, received data is obtained.

The construction of FIG. 2 will be described in more detail with reference to a waveform chart of FIG. 6. The waveform ① of FIG. 6 shows transmitted data wherein digital signals "1" and "0" of transmitted data are respectively represented by two different frequencies $f_1$ and $f_2$ during transmission.

The signals received at a receiver station usually undergo attenuation and contain noise and distortion. Thereafter, after being amplified up to a necessary level through the use of the amplifier, the received signals are supplied to the band-pass filter 21 to eliminate undesirable interference signals outside the band width of the FS signals and then supplied to the amplitude limiter to eliminate amplitude varying components and thus make the amplitude thereof fixed. The resulting FS signals are shown in FIG. 6②.

Figure 6:
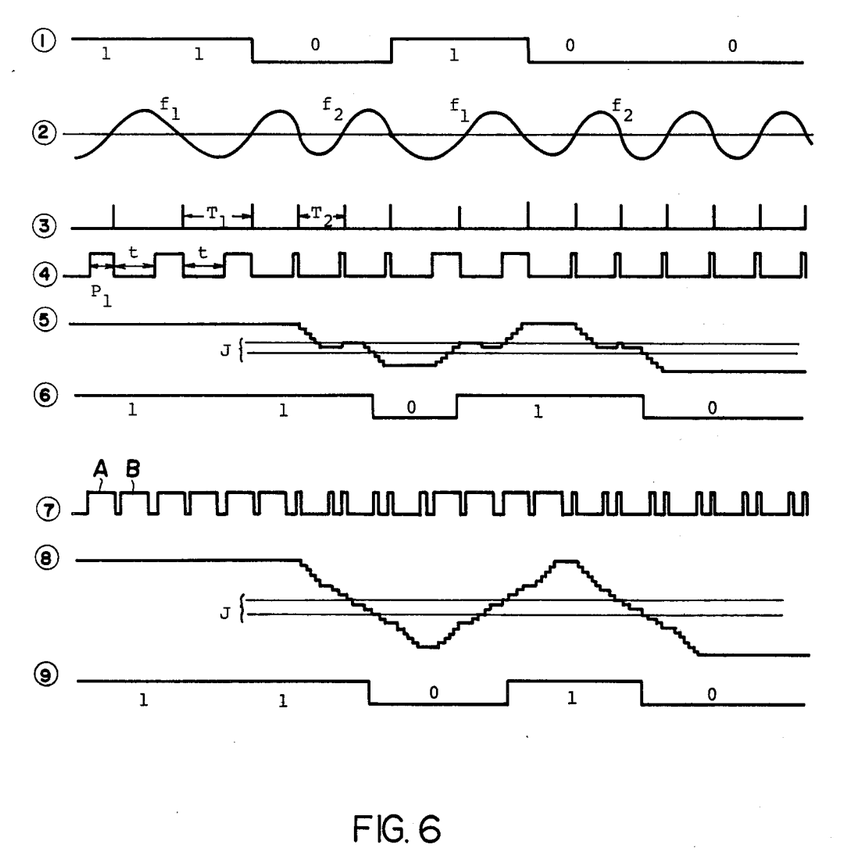
FIG. 6 is a time chart showing various waveforms occurring within the demodulator shown in FIGS. 2 and 3.

The FS signals shown in FIG. 6② are introduced into the zero-crossing detector 22 so as to change into the signals shown in FIG. 6② where a pulse is generated at every crossing with the time axis. The result is illustrated in FIG. 6③.

Assume now the frequency $f$ of the FS signals is equal to $f_0 \pm \Delta f$. In case where the frequency $f_1$ corresponding to "1" is equal to $f_0 - \Delta f$ and the frequency $f_2$ corresponding to "0" is equal to $f_0 + \Delta f$, the pulse interval T of the waveform shown in FIG. 6③ is within a range of the half period $T_1 = (1/2f_1)$ and $T_2 = (1/2f_2)$.

The signals shown in FIG. 6(3) from the zero-crossing detector 22 are then applied to the pulse converter 23 to obtain converted signals shown in FIG. 6(4). The signals shown in FIG. 6(4) take "0" during a first time slot beginning at the zero-crossing and "1" during a second time slot ending at the next succeeding zero-crossing.

In this instance, the period $t$ of the first time slot (the "0" region) is equal to $(1/2f_2)$ and therefore the output of the circuit 23 shown by FIG. 6(4) becomes a pulse of the width $$\left(\frac{1}{2f_1} - \frac{1}{2f_2}\right)$$

for $f_2$ and becomes almost "0" for $f_2$.

The signals from the pulse converter 23 as illustrated in FIG. 6(4) are supplied to the shift register 25 of the length corresponding to one modulation rate. That is, the length of the shift register is N/M bits where N is the clock frequency and M is the modulation rate.

The shift register 25 stores the output of the pulse converter 23 at every arrival of the clock signals and at the same time counter 26 counts the number of "1's" stored in the shift register 26. In the given example, the number of "1's" stored within the shift register 25 is $$N/M\left(1 - \frac{f_1}{f_2}\right)$$

when the frequency is $f_1$ and alternatively almost "0" when the frequency is $f_2$. The output of the counter 26 is illustrated by FIG. 6(5). The decision circuit 27 makes frequency discrimination by determining whether the signals shown by FIG. 6(5) exceed the predetermined decision level (J in FIG. 6(5)). Eventually, the received data is obtained as shown by FIG. 6(6). It is preferred that the predetermined decision level be selected near $$\frac{1}{2} \times \frac{N}{M}\left(1 - \frac{f_1}{f_2}\right)$$

to establish a non-sensitive region.

FIG. 3 illustrates another embodiment of the present invention. In case where a difference between the modulation rate and the signal frequencies $f_1$ and $f_2$ is small in the implementation shown in FIG. 2, for example, the modulation rate is 1200 BPS and the signal frequencies $f_1$ and $f_2$ are 1300 Hz and 2100 Hz, the received data shown by FIG. 6(6) is somewhat distorted as compared with the transmitted data (FIG. 6(1)). This is due to the fact that the number of "1's" within the shift register 25 does not vary during the time slot t as obvious from FIG. 6(4).

Accordingly, in the construction of FIG. 3, the shift register 25 of FIG. 2 is divided into two sections 25A and 25B. The output of the shift register 25A and the input of the shift register 25A are connected to the second shift register 25B via an addition circuit 28. The second shift register 25B is connected to the counter 26.

The band-pass filter, the zero-detector, the pulse converter, the clock generator, the counter and the decision circuit are similar to that shown in FIG. 2.

The length of the shift register 25A is selected somewhat longer than that of the $P_1$ shown by FIG. 6(4) such that the output of the addition circuit 28 is derived as shown by FIG. 6(7). Otherwise, if the length of the shift register 25A is equal to $P_1$, the pulses A and B shown by FIG. 6(7) are contiguous so that the pulses A and B may be overlapped by any distortion in the received signals.

The signals shown by FIG. 6(7) are introduced into the register 25B to thereby effect the above mentioned frequency discrimination. In this instance, the output of the counter 26 is illustrated in FIG. 6(8) while the received data obtained after passing through the decision circuit 27 is illustrated in FIG. 6(9).

In this manner, the received data obtained from the construction of FIG. 3 is approximately equal to the transmitted data as shown by FIG. 6(1) and that by FIG. 6(8).

Figure 4:
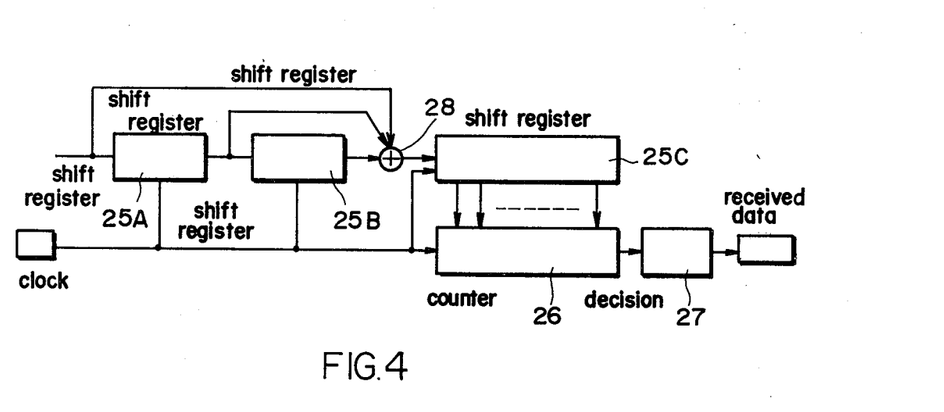

The implementation of FIG. 3 is effective in cases where the relation between $P_1$ and t is $P_1 < t$. In addition, in cases where $2P_1 < t$, it is recommended that the shift register 25 is divided into three sections 25A, 25B and 25C as shown in FIG. 4.

The counter 26 counting "1's" stored within the shift register 25 may be implemented in various manners. Nevertheless, because of the necessity for counting "1's" at every clock signal, the number of the clock signals multiplied by the length of the shift register 25 is required or a particular arithmetic circuit is needed.

Figure 5:
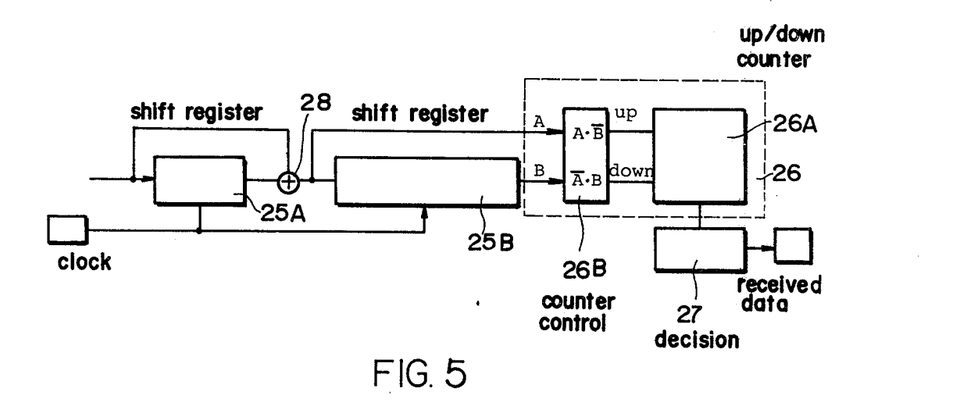
FIG. 5 is a block diagram showing an example of a counter circuit used with the present invention.

FIG. 5 shows a further simplified construction of the counter which comprises an up/down counter 26A and a control 26B providing up and down commands for the counter 26B. The output B of the shift register 25B and the input A of the shift register 25B (the output of the addition circuit) are introduced into the control 26B.

The control 26B functions under the following table:

|  | A | B |  |
| --- | --- | --- | --- |
| Up Count | 1 | 0 | $A . \bar{B}$ |
| Down Count | 0 | 1 | $\bar{A} . B$ |
| No Count | 0 | 0 | $\bar{A} . \bar{B}$ |
| No Count | 1 | 1 | $A . B$ |

In other words, when the input A of the shift register 25B is "1" and the output B of the register 25B is "0", the number of "1's" within the shift register 25B is one increased to increment one the counter 26A. Contrarily, when the input A is "0" and the output B is "1", the number of "1's" within the shift register 25B is one decreased to decrement one the counter 26A. When the input A is "1" and the output B is "1" or the input A is "0" and the output B is "0", the number of "1's" contained within the shift register 25B is not varied. The output of the up/down counter 26A is illustrated by FIG. 6(8).

In this manner, the above mentioned counter 26 makes it possible much more easily to count the number of "1's" stored within the shift register 25B. It is obvious that the shift register may be substituted by a memory and the counter counting "1's" may be substituted by one counting "0's".

The following describes the construction of the band-pass filter 21, the zero-crossing detector 22, the pulse converter 23, the shift register 25, the counter 26 and the decision circuit 27 from commercially available components.

Figure 7:
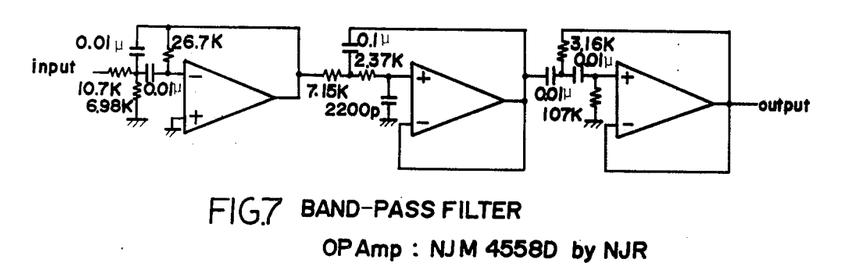
FIG. 7 is a detailed circuit diagram of a band-pass filter.
Figure 8A:
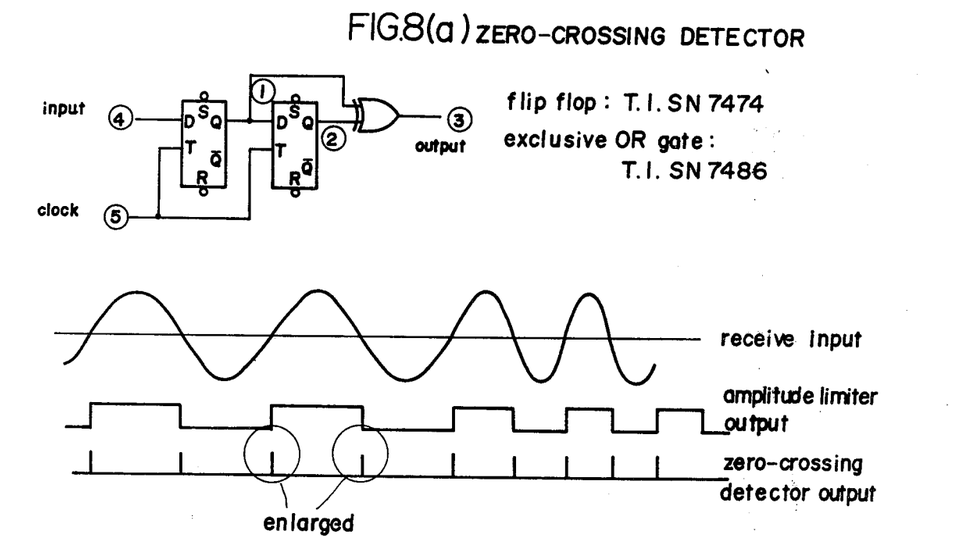
FIGS. 8(a) and 8(b) are a detailed circuit diagram and a time chart of a zero-crossing detector.
Figure 8B:
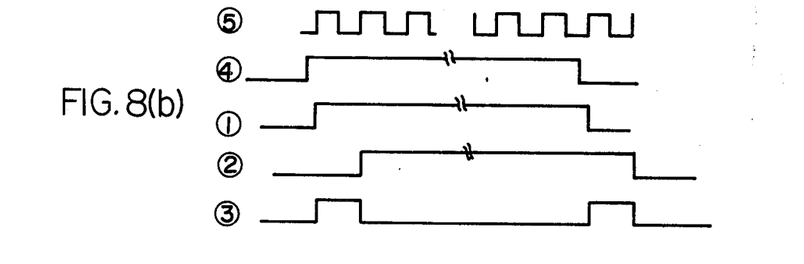

FIG. 7 shows a detailed construction of the band-pass filter 21 of FIG. 2. As noted above, the band-pass filter is to eliminate undesirable frequency components of the received signals and in fact, comprises an active filter including operational amplifiers, resistors and capacitors. The operational amplifiers include three stages: the first stage is a band-pass filter of the multiply feedback type; the second stage is a low-pass filter of the control source type; and the third stage is a high-pass filter of the control source type. Specifications of the filter are as follows:

Band width 900–2500 Hz
Center frequency 1500 Hz
Maximum ripple within band width 0.3 dB
Gain with 1500 Hz 8.2 dB
Attenuation factor about 27 dB/OCT FIG. 8(a) shows a detailed circuit arrangement of the zero-crossing detector 22 of FIG. 3 while FIG. 8(b) shows waveforms associated with the detector 22. Pulses of the width as shown by FIG. 8(b) are developed at the leading edge and the trailing edge of the FS signal wave which has been converted into a rectangular shape via the amplitude limiter. It comprises two flip-flops and an exclusive OR gate.

Figure 9A:
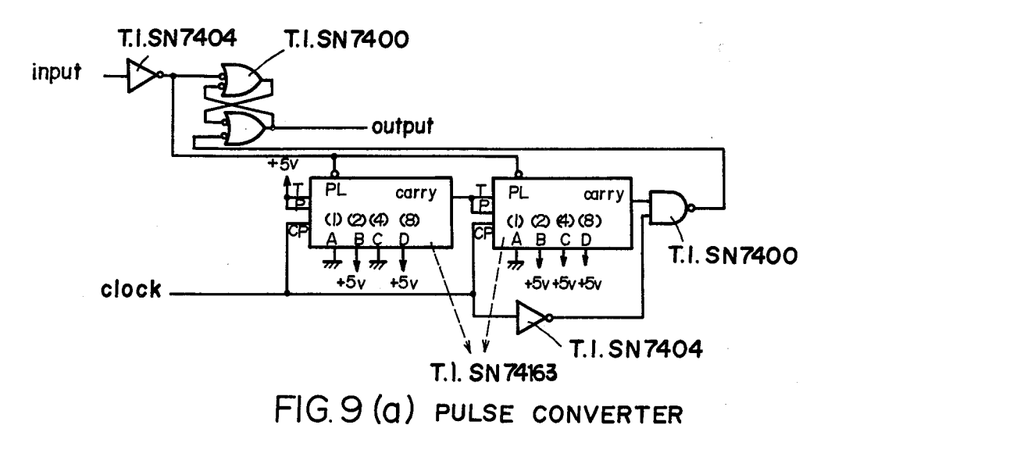
FIGS. 9(a) and 9(b) are a detailed circuit diagram and a time chart of a pulse converter.
Figure 9B:
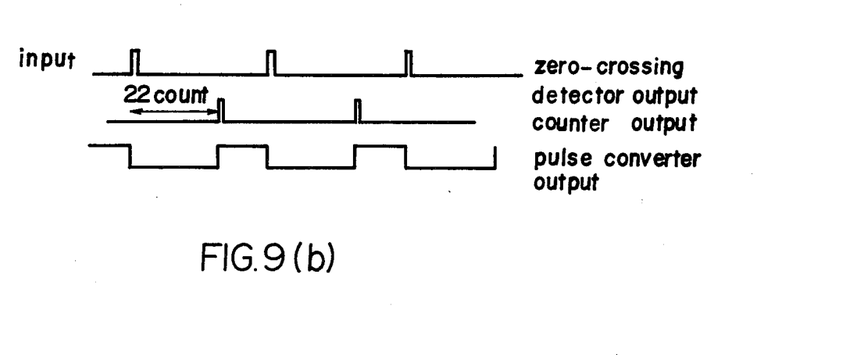

Details of the pulse converter 23 of FIG. 2 are illustrated in FIG. 9(a) while waveforms of signals occurring within the pulse converter are illustrated in FIG. 9(b). It comprises a flip-flop and a 8-bit counter. The output of the zero-crossing detector resets the flip-flop and presets the 8-bit counter with 234, thereby initiating the counting of the pulse converter 23. When the counter reaches 255 (that is, counts 22), the flip-flop is set. This circuit establishes pulses of the width corresponding to the wavelength or the frequency. The clock frequency is 89.488625 KHz. The frequencies of the FS signals are 1700 ± 400 Hz in case of 1200 BPS. The one-half wavelength of 2100 Hz, therefore, corresponds to 238.1 μsec and 21.3 clock signals. Because the flip-flop is set by the 22 count, the pulse width for the 2100 Hz wave is zero.

Figure 10A:
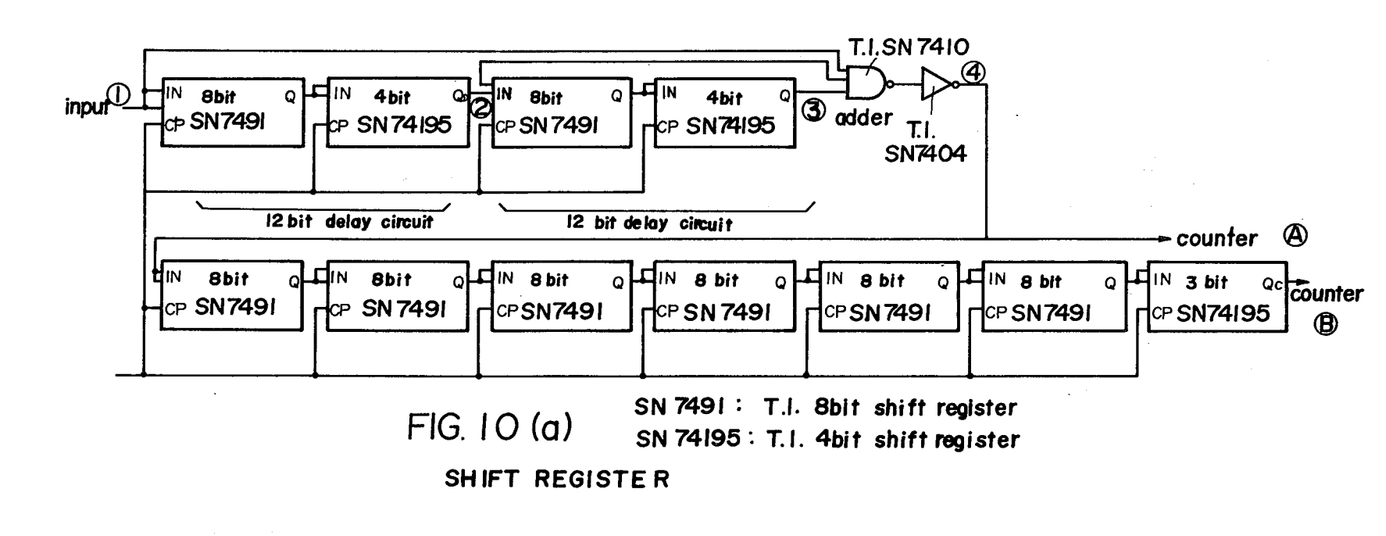
FIGS. 10(a) through 10(d) are detailed circuit diagrams and a time chart of a shift register.
Figure 10B:
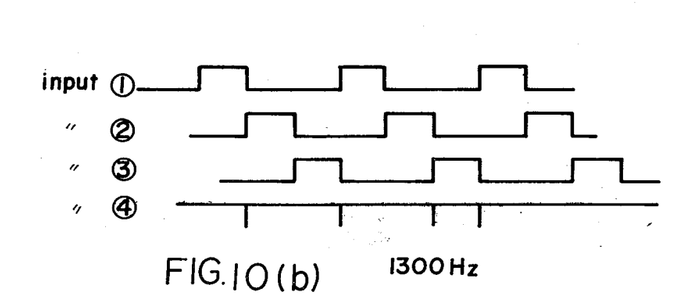
Figure 10C:
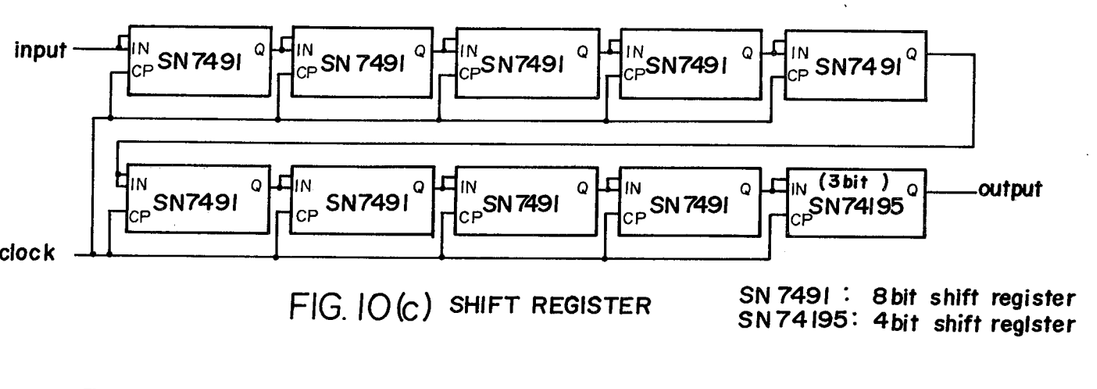
Figure 10D:
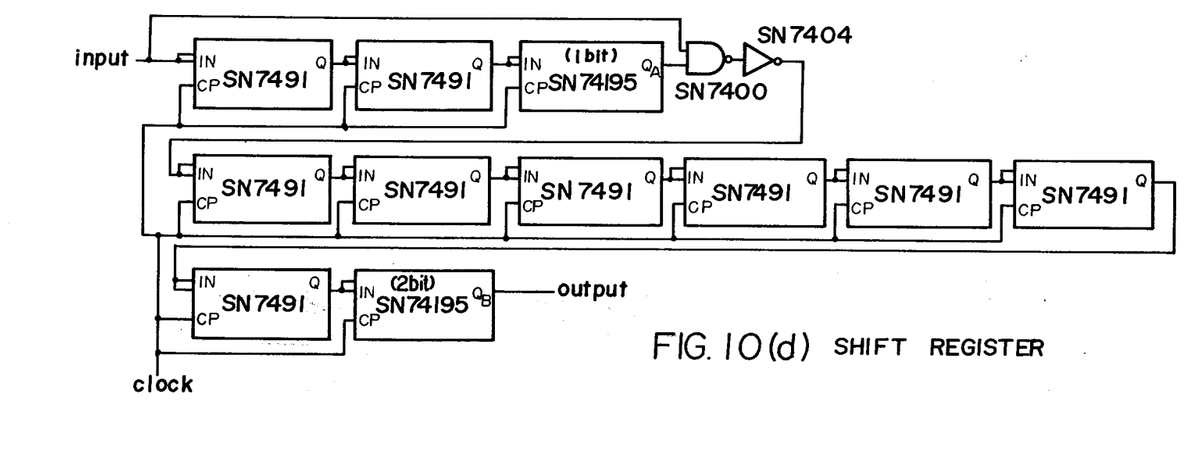

FIG. 10(a) shows details of the shift register 25 of FIG. 2. As stated above, the length of the shift register corresponds to a ratio of the clock frequency to the modulation rate and thus 74.57 when the clock frequency is 89.488625 KHz and the modulation rate is 1200 Hz. The length of the register is therefore 75 bits. In case where the frequency of the FS signals $f_1 = 1300$ Hz $(f_0 - \Delta f)$, the output of the pulse converter is zero. Since this causes distortion, two 12-bit delay circuits are provided within the 75 bit register. A total of the input and the outputs of the delay circuits is supplied to the remaining portion 51 bits (75-24) of the shift register. The one-half wavelength of 1300 Hz corresponds to 384.6 μsec and 34.4 clock signals. Since the pulse width of the output of the pulse converter corresponds to $34-22=12$ clock signals, the output is 12 bits delayed and overlapped so as to take "1". The interior of the 51 bit shift register bears almost "1" when $f_1 = 1300$ Hz and "0" when $f_1 = 2100$ Hz. This is identical with the embodiment of FIG. 4. FIG. 10(c) corresponds to the embodiment of FIG. 2 while FIG. 10(d) corresponds to the embodiment of FIG. 3.

Figure 11:
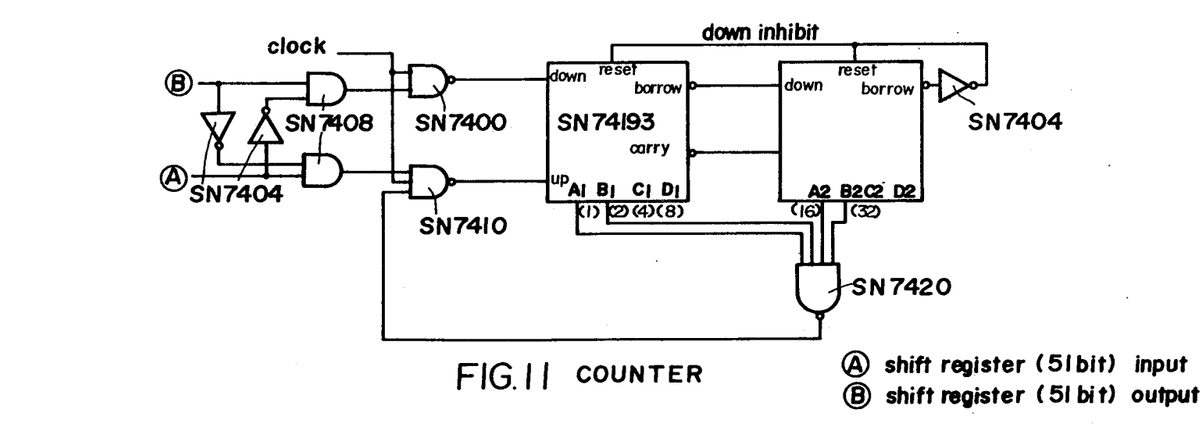
FIG. 11 is a detailed circuit diagram of a counter.

FIG. 11 shows details of the counter 26 shown by FIG. 2. It includes gates checking the input and the output of the shift register and a 8-bit up/down counter. The up/down counter counts up to 51 and counts down to 0.

Figure 12:
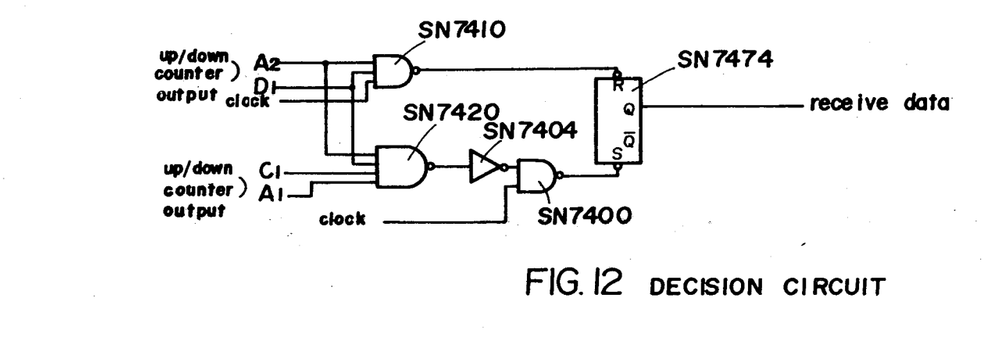
FIG. 12 is a detailed circuit diagram of a judge circuit.

Details of the decision circuit 27 illustrated in FIG. 2 are shown in FIG. 12. It decodes the output of the up/down counter and sets a flip-flop with 27 and resets the same with 24.

While only certain embodiments of the present invention have been described, it will be apparent to those skilled in the art that various changes and modification may be made therein without departing from the spirit and scope of the invention as claimed.

What is claimed is:

1. An FS signal demodulator comprising a zero-crossing detector which detects zero-crossings of frequency shift signals (FS), a pulse converter which generates a train of "0" and "1", "0" representative of a time slot from the first detected zero-crossing through a given period of time and "1" representative of a time slot from that period through the next succeeding zero-crossing, a memory means receiving the outputs of the pulse converter and thus containing the train of the pulses with the length corresponding to modulation rate, a counter means counting the number of "1's" or "0's" contained within the memory means in response to clock signals, and a determination circuit which effects frequency discrimination by comparing the counts of the counter means with a given limit.

2. An FS signal demodulator comprising a zero-crossing detector which detects zero-crossings of frequency shift signals (FS), a pulse converter which generates a train of "0" and "1", "0" representative of a time slot from the first detected zero-crossing through a given period of time and "1" representative of a time slot from that period through the next succeeding zero-crossing, a memory means receiving the outputs of the pulse converter and thus containing the train of the pulses with the length corresponding to modulation rate, said memory means being divided into at least two sections, a counter means counting the number of "1's" or "0's" contained within one section of said at least two sections of the memory means, means introducing the input and the output of the other section of said at least two sections of the memory means via an addition circuit into said one section of the memory means operatively associated with the counting means, and a decision circuit which effects frequency discrimination by comparing the counts of the counter means with a given limit.

3. The FS signal demodulator as set forth in clam 1, wherein the counting means comprises an up/down counter and a control providing up or down commands for the up/down counter, the input and the output of the memory means operatively associated with the counter means being applied to the control.

* * * * *